(12) United States Patent
Egedal et al.

(10) Patent No.: US 11,384,737 B2
(45) Date of Patent: Jul. 12, 2022

(54) DETERMINING AN ORIENTATION OF A ROTOR PLANE OF A WIND TURBINE

(71) Applicant: Siemens Gamesa Renewable Energy A/S, Brande (DK)

(72) Inventors: Per Egedal, Herning (DK); Jonas Helboe Joergensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 116 days.

(21) Appl. No.: 16/493,767

(22) PCT Filed: Jan. 5, 2018

(86) PCT No.: PCT/EP2018/050242
§ 371 (c)(1),
(2) Date: Sep. 13, 2019

(87) PCT Pub. No.: WO2018/177615
PCT Pub. Date: Oct. 4, 2018

(65) Prior Publication Data
US 2020/0124030 A1    Apr. 23, 2020

(30) Foreign Application Priority Data

Mar. 31, 2017 (DE) ............ 10 2017 205 559.6

(51) Int. Cl.
*F03D 17/00* (2016.01)
*F03D 7/02* (2006.01)

(52) U.S. Cl.
CPC .......... *F03D 17/00* (2016.05); *F03D 7/0204* (2013.01); *F05B 2270/327* (2013.01); *F05B 2270/329* (2013.01); *F05B 2270/802* (2013.01)

(58) Field of Classification Search
CPC .. F03D 7/0204; F03D 17/00; F05B 2270/327; F05B 2270/329
See application file for complete search history.

(56) References Cited

U.S. PATENT DOCUMENTS 7,244,100 B2    7/2007 Yoshida
7,855,469 B2   12/2010 Stegemann et al.
(Continued)

FOREIGN PATENT DOCUMENTS

CN    101349240 A    1/2009
CN    101395479 A    3/2009
(Continued)

OTHER PUBLICATIONS

PCT International Search Report dated Apr. 18, 2018 corresponding to PCT International Application No. PCT/EP2018/050242.
(Continued)

*Primary Examiner* — Christopher R Legendre
(74) *Attorney, Agent, or Firm* — Schmeiser, Olsen & Watts LLP

(57) ABSTRACT

A method is provided for determining an orientation of a rotor plane of a wind turbine, including the following steps: determining direction information of a moving part of a wind turbine on basis of at least one signal of a positioning system received at the moving part, determining the orientation of the rotor plane on basis of the determined direction information. Further, a wind turbine and a device as well as a computer program product and a computer readable medium are suggested for performing the method.

12 Claims, 5 Drawing Sheets

(56) References Cited

U.S. PATENT DOCUMENTS

| | | | |
|---|---|---|---|
| 8,092,174 B2 | 1/2012 | Egedal | |
| 9,133,824 B2 | 9/2015 | Friedrich et al. | |
| 9,879,653 B2 | 1/2018 | Caruso et al. | |
| 10,202,964 B2 | 2/2019 | Spruce | |
| 10,202,965 B2 | 2/2019 | Bertolotti et al. | |
| 10,519,935 B2 | 12/2019 | Sakaguchi et al. | |
| 2009/0039651 A1 | 2/2009 | Stiesdal | |
| 2010/0078939 A1 | 4/2010 | Kammer et al. | |
| 2010/0092289 A1 | 4/2010 | Altenschulte | |
| 2010/0143128 A1 | 6/2010 | Mccorkendale | |
| 2011/0044811 A1 | 2/2011 | Bertolotti | |
| 2013/0334817 A1 | 12/2013 | Scholte-Wassink | |
| 2014/0020465 A1* | 1/2014 | Laurberg | F01D 21/003 73/495 |
| 2015/0240783 A1 | 8/2015 | Kii et al. | |
| 2015/0276786 A1 | 10/2015 | Zuo et al. | |
| 2016/0032897 A1 | 2/2016 | Hawkins | |
| 2020/0124030 A1* | 4/2020 | Egedal | F03D 7/0204 |

FOREIGN PATENT DOCUMENTS

| | | |
|---|---|---|
| CN | 102032112 A | 4/2011 |
| CN | 102644546 A | 8/2012 |
| CN | 102852720 A | 1/2013 |
| CN | 104863794 A | 8/2015 |
| CN | 106471247 A | 3/2017 |
| CN | 106528908 A | 3/2017 |
| EP | 1559910 A1 | 8/2005 |
| EP | 2175130 A2 | 4/2010 |
| EP | 2202407 A2 | 6/2010 |
| EP | 2489872 A1 | 8/2012 |
| EP | 2599993 A1 | 6/2013 |
| EP | 2918827 A1 | 9/2015 |
| EP | 2980404 A1 | 2/2016 |
| EP | 3181896 A1 | 6/2017 |
| WO | WO 2012153185 A1 | 11/2012 |
| WO | WO 2013004244 A2 | 1/2013 |
| WO | WO 2016008500 A1 | 1/2016 |

OTHER PUBLICATIONS

Written Opinion dated Apr. 18, 2018 corresponding to PCT International Application No. PCT/EP2018/050242.
Chinese Office Action dated Jul. 9, 2021 for Application No. 201880022205.6.

* cited by examiner

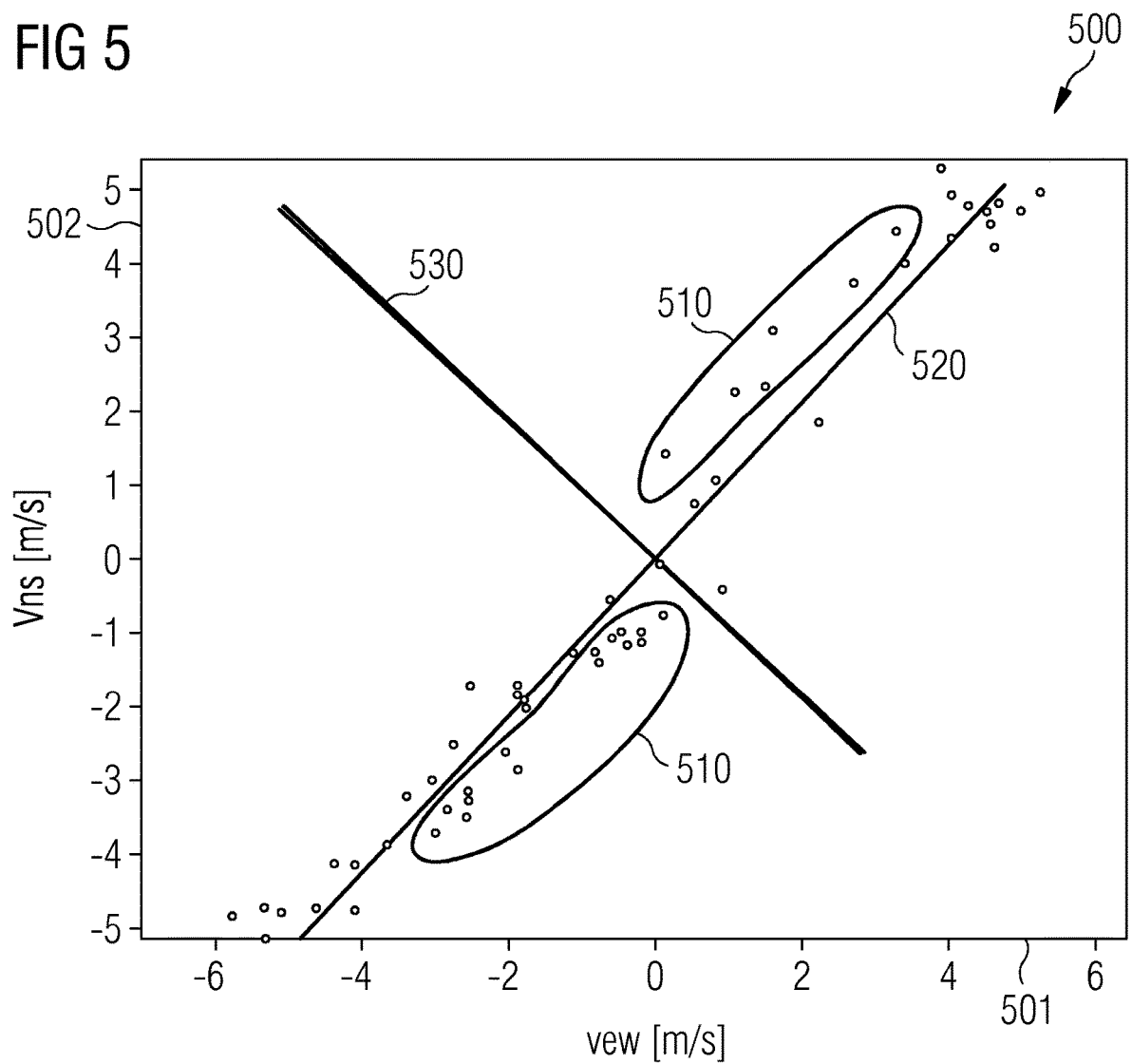

DETERMINING AN ORIENTATION OF A ROTOR PLANE OF A WIND TURBINE

CROSS-REFERENCE TO RELATED APPLICATIONS

This application claims priority to PCT Application No. PCT/EP2018/050242, having a filing date of Jan. 5, 2018, which is based on German Application No. 10 2017 205 559.6, having a filing date of Mar. 31, 2017, the entire contents both of which are hereby incorporated by reference.

FIELD OF TECHNOLOGY

The following relates to a method, a wind turbine and to a device for determining an orientation of a rotor plane of a wind turbine. In addition, a computer program product and a computer readable medium are suggested.

BACKGROUND

A wind turbine in operation will not always experience wind perpendicular to a rotor plane. When the rotor plane (which is also referred to as "heading") of a wind turbine is not perpendicular to the wind, the efficiency will decrease. Therefore, actual wind turbines comprise a yaw system designed to automatically adjust their heading, like, e.g., rotating the rotor plane perpendicular to the incoming wind or to maintain an angle relative to the wind to maximize the surface area of the turbine rotor ("yawing").

Usually, the yaw system is part of a nacelle, which may be involved in a yawing movement, i.e. being rotatable mounted on top of a tower via at least one yaw bearing. A rotor is attached to an upwind side of the nacelle. The rotor is coupled via a drive train to a generator housed inside the nacelle. The rotor includes a central rotor hub and a plurality of blades mounted to and extending radially from the rotor hub defining the rotor plane.

It is important for wind power plant operators to know an actual position or direction of the rotor plane or heading of the respective wind turbine, the plane or heading being correlated with an actual position or direction of the nacelle. The actual direction of the nacelle is also referred to as a yaw direction or a yaw position or, in relation to a predefined direction (e.g. a cardinal direction), as a yaw angle ("absolute yaw angle"). Alternatively the yaw angle may be defined as the direction of the nacelle in relation of the direction of the incoming wind (also referred to as "yaw angle error" representing the angle out of incoming wind).

In order to determine, e.g., an absolute yaw angle, a wind turbine may be equipped with a yaw encoder, measuring the relative yaw direction in relation to a stationary object like, e.g., a tower being secured to a foundation at ground level. The yaw encoder is typically calibrated by determining a reference yaw direction or reference yaw angle after finalization of the wind turbine installation (also referred to as "initial calibration").

In some scenarios the initial calibration of the yaw angle is incorrect or less accurate due to applying a rough estimate or rule of thumb to determine a cardinal direction as a basis or reference for the yaw angle calibration.

A further reason for an inaccurate yaw angle calibration is a wind turbine installation based on a design including powerful permanent magnets, eliminating the possibility of applying magnetic compasses to determine the yaw direction or yaw angle. The exemplary use of a magnetic compass, as a further general disadvantage, comprises inaccurateness per se, in particular at installations located at high geographic latitudes.

Further on, the aforementioned systems may bear the risk that a specific yaw position or yaw direction offset may be overwritten or deleted in a wind turbine configuration like, e.g., a software parameter list. There might be also a risk of the yaw sensor being changed during service of damage. In such kind of situation there might be a risk of a not properly calibrated yaw position and that a wrong yaw position might be read out.

A further possible approach for calibrating a yaw system of a wind turbine may be based on a determination of a true sun position in relation to a current position of the wind turbine wherein the calibration is based on the determined true sun position and turbine specific information like, e.g., geographic position of the wind turbine, calendar information and calibration information. As a disadvantage, calibration of such kind of yaw system is only possible during time periods of sun shine.

SUMMARY

An aspect relates to an improved approach for optimizing the yaw system of a wind turbine.

In order to overcome this problem, a method is provided for determining an orientation of a rotor plane of a wind turbine,
wherein direction information of a moving part of a wind turbine is determined on basis of at least one signal of a positioning system received at the moving part,
wherein the orientation of the rotor plane is determined on basis of the determined direction information.

Orientation of the rotor plane may be a current heading of the rotor plane (and thus of the wind turbine) or the respective yaw direction of the wind turbine typically being rectangular to the rotor plane. The resulting orientation may be represented by any information suitable to reflect, e.g., a heading of the rotor or a yaw direction of the nacelle or the wind turbine. Such kind of information may be a vector information or an angle information or a slope information of a line or a plane.

Moving part of a wind turbine may be a rotating part of the rotor like, e.g., a central hub, a spinner or one or more rotor blades. Alternatively, the moving part of the wind turbine may be the nacelle moving back and forth, e.g., with a tower frequency.

Direction information may be any information representing a determined or measured direction of the moving part. As an example, the direction of an element, object or defined position/location of the moving part (during movement or rotation) may be determined. Such element or object may be a specific measurement- or positioning-sensor being fixed to the moving part.

As an example, the direction information may be provided by a GPS-sensor as a fixed part of a rotor blade or a spinner or being mounted thereto. Thereby, the direction of the rotating sensor (and thus of the rotor) may be measured or determined based on received satellite signals being part of a Global Positioning System ("GPS signals").

The determined direction information may be a three-dimensional information represented by a vector information. Alternatively the direction information may be a two-dimensional information in relation to a horizontal plane. Standard GPS-sensors very often provide such kind of two-dimensional direction information.

The direction information may be determined, e.g., during given time intervals or permanently. In the latter case a number or a set of direction information may be provided by the moving or rotating GPS sensor thereby continuously determining the current direction of the sensor based on the received GPS signals.

According to one possible embodiment, the GPS sensor may comprise at least one GPS antenna for receiving the GPS signals and a GPS module connected thereto for further processing of the received signals, e.g. determining the direction information. Thereby, the at least one GPS antenna may be fixed to the rotor blade or at the outer region of the spinner wherein the GPS module may be located in an interior of the spinner.

Further to the direction information, the GPS sensor may also provide a speed information corresponding to the respective direction information representing, e.g., a value of absolute speed of the rotating sensor in the corresponding direction (as represented by the determined direction information). Thereby, the determined direction information together with the corresponding speed information may be provided separately by the GPS sensor, e.g., via two individual outputs of the GPS module.

The determined direction information optionally in combination with the corresponding speed information may be also referred to as "velocity information" or "velocity vector".

One aspect of the proposed solution is the evaluation of Doppler Shifts of positioning signals received by a moving or rotating sensor of the wind turbine thereby allowing a precise measurement or determination of the direction and optionally the speed of the sensor. By directly determining the direction information based on Doppler Shifts (instead of processing usual GPS-coordinates) the current direction of a rotating sensor can be determined with very high accuracy. As an example, by processing Doppler-Shifts, standard GPS-sensors may be able to measure the current direction with a precision of 0.5 degrees and the speed with a precision of 0.1 m/s. Thereby, the accuracy of the measured direction may depend of the speed of the rotating GPS antenna wherein the accuracy increases with increasing rotation speed.

According to embodiments of the invention presented, the moving or rotating GPS-antenna is moving/rotating in the plane of the rotor. As a consequence all of the direction information provided by the GPS-sensor will be in line of, i.e. in parallel to this plane. Thus, the determined direction information can be used to determine the plane orientation of the rotor wherein the corresponding yaw direction must be perpendicular to this plane.

According to a further aspect of the proposed solution the yaw direction may be continuously determined thus minimizing the risk of being deleted or overwritten. As a further advantage, the proposed solution provides a more accurate determination of the orientation of the rotor plane thus allowing a more accurate calibration of the yaw system. Consequently, the wind turbine can be operated effectively by, e.g., curtailing the wind turbine in certain sectors. This kind of curtailed operation may be applied, e.g. due to noise-control wherein the wind turbine is curtailed in a situation where neighbors living close to the wind turbine are temporarily located in a downwind-direction in relation to the location of the wind turbine. The knowledge of an accurate yaw direction is also important with regard to wind park optimization and wake control.

In an embodiment,
a speed information of the moving part of the wind turbine is determined on basis of the at least one received signal of the positioning system,
wherein the speed information is corresponding to the respective direction information,
wherein the orientation of the rotor plane is determined on basis of the determined direction information and the corresponding speed information.

A set of determined direction information may comprise individual direction information pointing into different or opposite directions. A modulus functionality may be applied to the individual direction information to eliminate or compensate the different or opposite directions.

Optionally an averaging functionality may be applied to the determined individual direction information calculating a mean direction information based on the determined individual direction information by, e.g. calculating an average of respective angles represented by the individual direction information.

In another embodiment,
a speed information in relation to a north-south direction and
a speed information in relation to an east-west direction is determined on basis of the determined direction information and the corresponding speed information,
wherein the orientation of the rotor plane is determined on basis of
the determined speed information in relation to the north-south direction and
the speed information in relation to an east-west direction.

The determined speed information in relation to north-south direction and the speed information in relation to east-west direction are both representing components of a velocity vector representing speed in relation to a horizontal plane. Thereby, each vector represents a data point in the horizontal plane. A suitable "line fitting" algorithm can be applied to identify appropriate line parameters like, e.g. a slope and offset of the line. Based on the identified line parameters, in particular based on the slope, the orientation of the rotor plane or the yaw direction may be derived.

In a further embodiment, a yaw direction of the wind turbine is provided, wherein
a speed information in relation to a side-side orientation of the wind turbine and
a speed information in relation to a fore-after orientation of the wind turbine is determined on basis of the determined direction information and the corresponding speed information and the provided yaw direction,
wherein the orientation of the rotor plane is determined on basis of
the determined speed information in relation to the side-side orientation and
the speed information in relation to the fore-after orientation.

In a next embodiment, the moving part of the wind turbine
is a rotating part of a rotor of the wind turbine, or
is a nacelle and/or a tower.

Pursuant to another embodiment, the received signal is a satellite signal of a satellite-based Global Positioning System (GPS).

It should be noted that any other signal of a wireless positioning system may be used. That positioning system may be a satellite based positioning system or any other positioning system, e.g. based on terrestrial antennas, sending out wireless signals.

Further examples of satellite-based positioning systems are:

GLONASS—Russia's global navigation system;

Galileo—a global system being developed by the European Union and other partner countries;

Beidou—People's Republic of China's regional system, currently limited to Asia and the West Pacific According to an embodiment, the direction information is determined on basis of an analysis of Doppler Shifts of the at least one GPS signal received at the moving part. GPS signals sent out by more than three satellites are analyzed to achieve a suitable accuracy.

According to another embodiment, the orientation of the rotor plane is determined on basis of the determined direction information having a corresponding speed information above a defined threshold.

Pursuant to a further embodiment, movement information of the tower and/or the nacelle is determined on basis of at least one signal provided by at least one accelerator sensor being fixed to the tower and/or nacelle,
wherein the orientation of the rotor plane is determined on basis of the determined movement information.

During operation of the wind turbine the nacelle is moving (like e.g. oscillating or vibrating) back and forth. Usually this movement comprises the same or a similar frequency than the rotation frequency of the rotating rotor which might induce a systematic error concerning the determined orientation of the rotor plane, resulting, e.g., in a deficient direction and speed information provided by the positioning system. By using the movement information provided by the at least one accelerator based on a measurement of acceleration in back-forth and/or side-side direction the oscillation or vibration caused by the tower can be compensated or filtered out.

According to an exemplary embodiment, the direction and speed information provided by the positioning system may be processed, i.e. filtered/compensated on basis of the movement information provided by the accelerator sensor. The resulting (filtered/compensated) direction and speed information might be processed further on according to the proposed solution.

The problem stated above is also solved by a wind turbine comprising
  at least one moving part, and
  a processing unit that is arranged for
    determining direction information of the moving part on basis of at least one received signal of a positioning system,
    determining an orientation of the rotor plane on basis of the determined direction information.

The problem stated above is also solved by a device comprising and/or being associated with a processing unit and/or hard-wired circuit and/or a logic device that is arranged such that the method as described herein is executable thereon.

The processing unit may comprise at least one of the following: a processor, a microcontroller, a hard-wired circuit, an ASIC, an FPGA, a logic device.

The solution provided herein further comprises a computer program product (non-transitory computer readable storage medium having instructions, which when executed by a processor, perform actions) directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

BRIEF DESCRIPTION

Some of the embodiments will be described in detail, with references to the following Figures, wherein like designations denote like members, wherein:

FIG. 5 exemplarily illustrates in a graph one resulting orientation of a rotor plane as derived according to the suggested solution.

DETAILED DESCRIPTION

Figure 1:
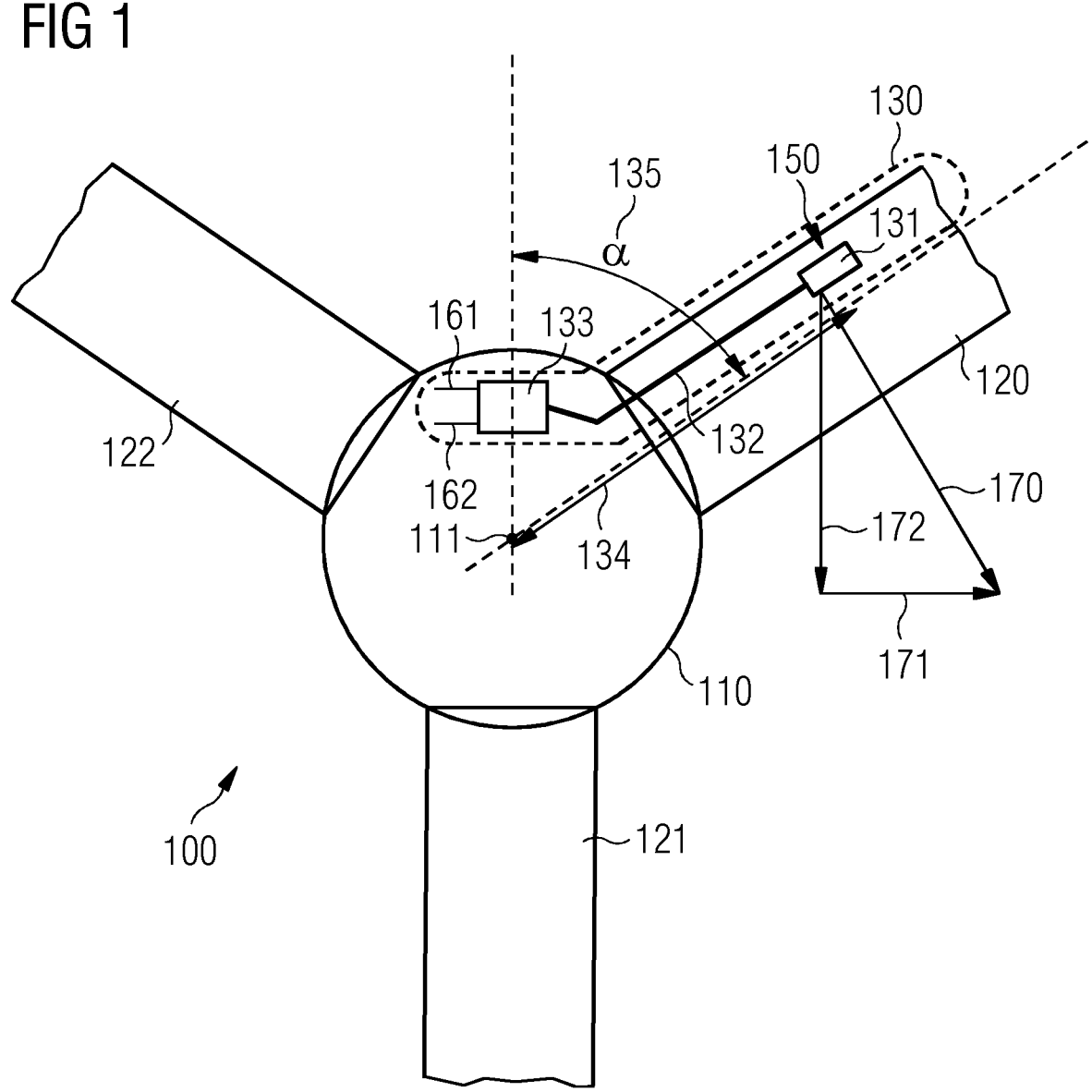
FIG. 1 shows an overview illustration of a wind turbine for use of the method according to embodiments of the invention.

FIG. 1 shows in an exemplary schematic view a rotor 100 of a wind turbine comprising a rotor hub 110 together with three rotor blades 120, 121, 122 extracting out of the rotor hub 110 in radial direction. A GPS-sensor (highlighted by a dotted line 130) is assigned to the rotor 100 comprising a GPS antenna 131 being fixed to the rotor blade 120 in a radial distance (represented by an arrow 134) from a center 111 of the rotor hub 110. The GPS-antenna 131 is connected via a connection line 132 to a GPS module 133 of the GPS-sensor 130 located, e.g., inside the rotor hub 110. Alternatively the GPS module 133 may be also located in the rotor blade 120. According to a further possible embodiment, the GPS antenna 131 may be located in the radial outer section of a spinner of the rotor hub 110. As a further alternative the GPS module 133 together with the GPS antenna 131 and the connection line 132 may be also part of a nacelle of the wind turbine.

During operation of the wind turbine, i.e. during rotation of the rotor 110 the GPS-antenna is rotating in the plane of the rotor 100. In FIG. 1 a current velocity of the GPS-antenna 131 representing the corresponding speed and direction of the rotating GPS-antenna 131 is illustrated by a velocity vector 170 comprising a horizontal velocity 171 in relation to a horizontal plane and a vertical velocity 172 in relation to a vertical plane. The current rotor azimuth position 135 of the rotating GPS antenna 131 is represented by an azimuth angle $\alpha$.

During operation of the wind turbine GPS-signals 150 of a satellite-based Global Positioning System are received by the rotating GPS antenna 131 and being forwarded via the connection line 132 to the GPS module 133. By evaluating Doppler Shifts of the received GPS-signals 150 by a suitable processing unit (not shown) of the GPS module 133 a direction information d is determined which is provided via a first output 161 of the GPS module 133. Thereby, the direction information d is representing the current direction of the horizontal velocity 171 in [deg] in relation to true north.

Further, a corresponding speed information s is determined by the processing unit which is provided via a second output 162 of the GPS module 133. Thereby, the speed information s is representing an absolute speed of the rotating GPS antenna 131 in [m/s] in the current direction represented by the horizontal velocity 171 (i.e. the "length" of the horizontal velocity 171).

Figure 2:
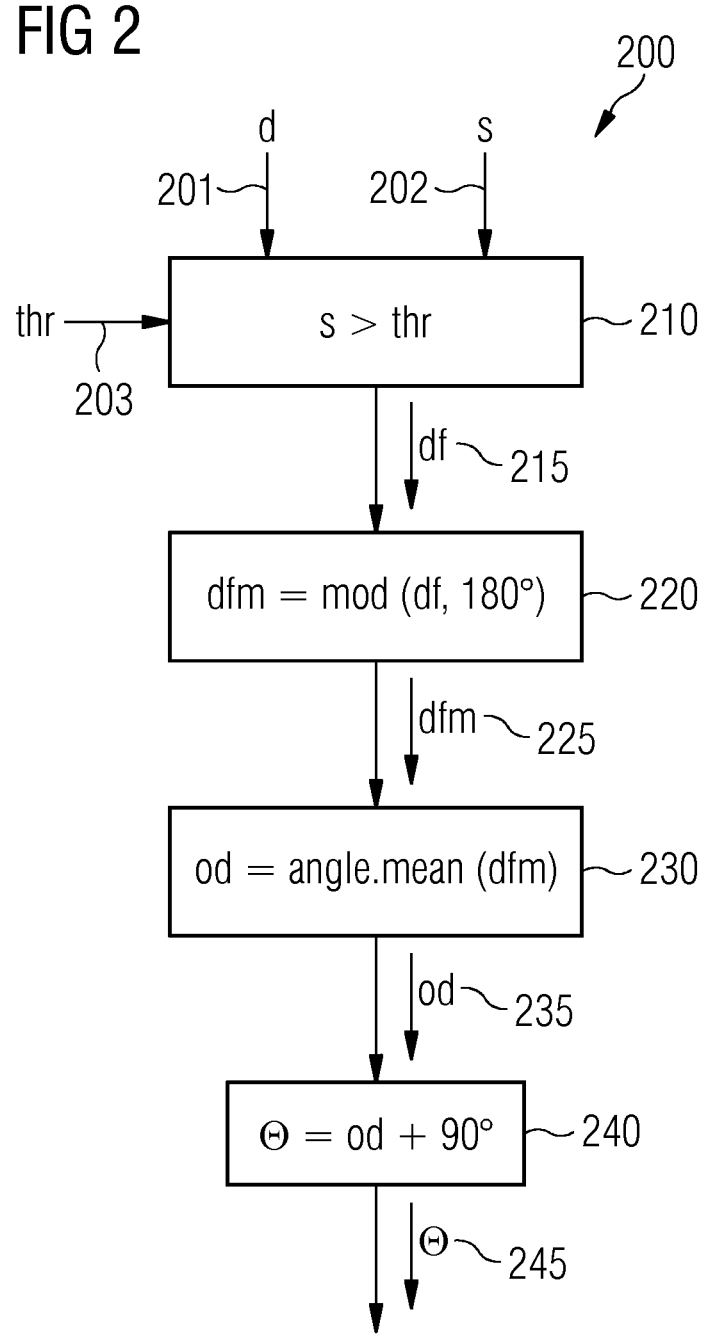
FIG. 2 shows in an exemplary flowchart a first possible functional embodiment of the proposed solution.

Further below, several possible embodiments of the suggested solution are now explained in more detail:

FIG. 2 shows in an exemplary flowchart 200 a first possible functional embodiment of the proposed solution based on several functional blocks each representing a functional step according to the proposed solution.

A direction information d 201 provided by the first output 161 and a corresponding speed information s 202 provided by the second output 162 of the GPS module 133 is relayed to a filter block 210. A speed threshold value thr 203 is further provided to the filter block 210. The filter block 210 is configured according to the following rule:

$$s > thr$$

wherein only direction information d 201 with a corresponding speed information s 202 above the threshold value thr 203 is passing the filter block 210. Resulting filtered direction information df 215 is transferred to a block 220 implementing the following "modulus of angle" functionality:

$$dfm = mod(df, 180°)$$

According to one aspect of the suggested solution, only those direction information d 201 is passing the filter block 210 having a sufficient high corresponding speed information s 202 wherein s>thr. As can be recognized by the exemplary scenario of FIG. 1 the rotating GPS-antenna 131 has the highest absolute speed in horizontal direction at a rotor azimuth position 135 of α=0° and α=180°. Consequently, the threshold value thr is configured in a way wherein only "filtered" direction information df 215 at a preferred rotor azimuth position 135 of α=0° and α=180° is passing the filter block 210. It should be noted that the rotor azimuth position 135 of the presented solution is not limited to the aforementioned values of α=0° and α=180°. According to the claimed solution an interval or an area of azimuth positions 135 around the aforementioned values of α=0° and α=180° may be also applicable.

As the "filtered" direction information df 215 at the rotor azimuth position α=0° and α=180° is pointing into opposite directions (but being in line with the rotor plane) a modulus functionality is applied being implemented in a block 220 to eliminate or compensate the opposite directions:

$$dfm = mod(df, 180°)$$

The resulting direction information dfm 225 is forwarded to an averaging block 230 deriving a mean direction od 235 of the provided direction information dfm 225:

$$od = \text{mean·angle}(dfm)$$

The mean direction od 235 may be determined by an average calculation of the respective angles represented by the individual direction information dfm 225.

The resulting direction information od 235 is representing a current orientation [in deg] of the rotor plane in relation to the horizontal plane and in relation to true north.

According to a further optional step 240 a yaw direction φ 245 being rectangular to the determined orientation od 235 of the rotor plane can be derived based on the following rules:

$$\varphi = od + 90°$$

or $$\varphi = od - 90°$$

(both rules may be applied because there are two directions existing being orthogonal to the direction od)

Figure 3:
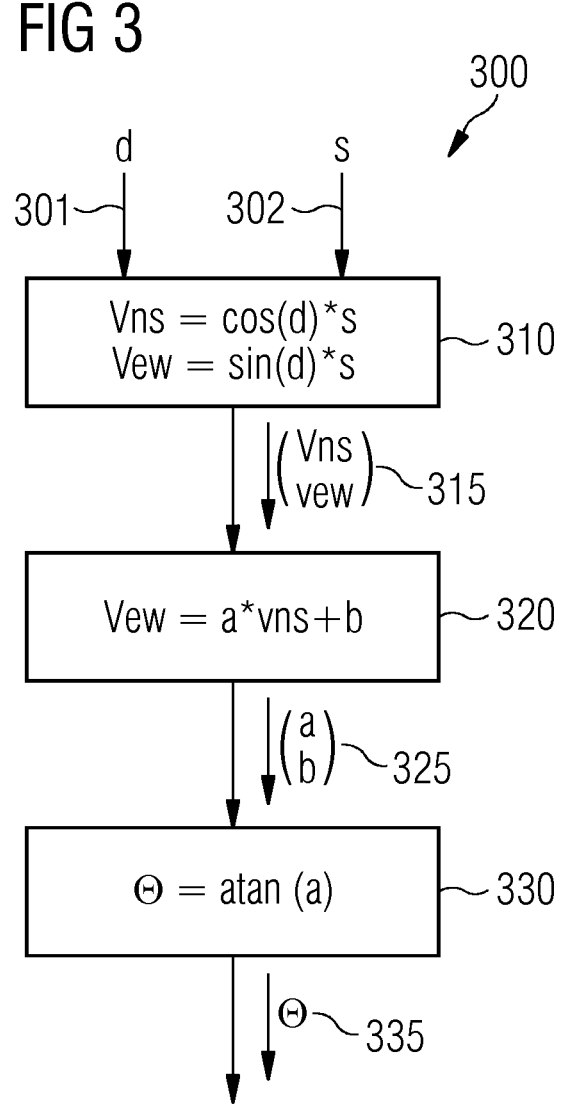
FIG. 3 shows in a further exemplary flowchart a second possible functional embodiment of the proposed solution based on a calculated velocity vector.

FIG. 3 shows in a further exemplary flowchart 300 a second possible functional embodiment of the proposed solution based on a calculated velocity vector.

Thereby, direction information d 301 provided by the first output 161 and a corresponding speed information s 302 provided by the second output 162 of the GPS module 133 is transferred to a velocity vector calculation block 310. Based on the provided information 301, 302 a velocity vector 315 is calculated according to the following rule:

$$vns = \cos(d) * s$$

$$vew = \sin(d) * s$$

wherein vns is representing the velocity in the horizontal plane in north-south direction vew is representing the velocity in the horizontal plane in east-west direction In a subsequent "line fitting" box 320 appropriate line parameters 325 a (slope) and b (offset) are derived based on the provided velocity vector 315 according to the following rule:

$$vew = a * vns + b$$

It should be notated that the line parameters 325 may be determined based on alternative methods like, e.g., statistical analysis like modeling on basis of linear or polynomial regression.

Based on the determined line parameter 325, in particular based on the derived slope "a" a corresponding yaw direction θ (in [deg]) 335 is calculated in a successive "find yaw direction" box 330 implementing the following rule:

$$\theta = a\tan(a)$$

Thereby, the resulting angle 335 is representing the yaw direction in relation to the horizontal plane and in relation to true north.

Figure 4:
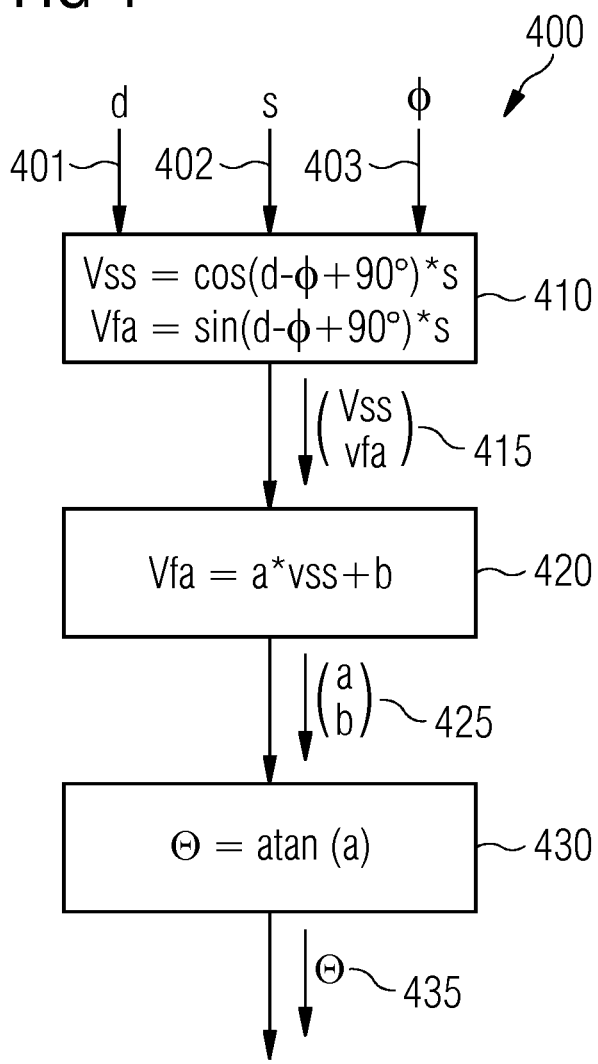
FIG. 4 shows in a third exemplary flowchart a further possible functional embodiment of the proposed solution based on a calculated velocity vector.

FIG. 4 shows in a third exemplary flowchart 400 a further possible functional embodiment of the proposed solution based on a calculated velocity vector.

Thereby, direction information d 401 provided by the first output 161, a corresponding speed information s 402 provided by the second output 162 of the GPS module 133 and a current yaw direction information φ 403 provided by a yaw controller (not shown) of the wind turbine is passed to a velocity vector calculation block 410. Based on the provided information 401 . . . 403 a velocity vector 415 is calculated according to the following rule:

$$vss = \cos(d - \varphi + 90°) * s$$

$$vfa = \sin(d - \varphi + 90°) * s$$

wherein vss is representing the velocity in a side-side direction in the wind turbine coordinate system, vfa is representing the velocity in a for-after direction in the wind turbine coordinate system In a subsequent "line fitting" box 420 appropriate line parameter 425 comprising "a" (slope) and "b" (offset) are derived based on the provided velocity vector 415 according to the following rule:

$$vfa = a * vss + b$$

Again, it should be notated that the line parameter 425 may be determined based on alternative methods like, e.g., statistical analysis like modeling on basis of linear or polynomial regression.

Based on the determined line parameter 425, in particular based on the derived slope "a" a corresponding yaw direction θ (in [deg]) 435 is calculated in a successive "find yaw direction" box 430 implementing the following rule:

$$\theta = a\tan(a)$$

Thereby, the resulting angle φ 435 is representing a direction in relation to the yaw direction information 403 provided by the yaw controller.

FIG. 5 exemplarily illustrates in a graph 500 one resulting orientation of a rotor plane as derived according to the suggested solution based on a calculated velocity vector.

Thereby an abscissa 501 is representing the velocity vew in [m/s] in the horizontal plane in east-west direction and an ordinate 502 is representing the velocity vns in [m/s] in the horizontal plane in north-south direction.

Each data point (some of them are exemplarily highlighted by a reference number 510) is representing a resulting velocity vector 315 provided by the velocity vector calculation box 310. The position of each data point in the graph 500 is determined according to its respective velocity in the horizontal plane in east-west direction and velocity in the horizontal plane in north-south direction.

As an outcome of the line fitting algorithm implemented in box 320 a line 520 with the respective slope a and offset b is representing the best fitting line along the data points 510. According to the proposed solution, the line 520 is representing the current orientation or plane of the rotor of the wind turbine.

Based on the identified rotor plane 520 a corresponding yaw direction 530 of the rotor can be optionally determined usually being rectangular to the rotor plane 520.

According to a further embodiment of the proposed solution, the GPS-sensor may be also located in or at the nacelle thereby measuring the velocity of the whole nacelle moving back and forth with a tower frequency. Thereby, the tower oscillates in a slightly different direction than the yaw direction wherein the difference can be corrected or compensated by using an accelerator-sensor like, e.g. a Gyroscope-sensor (G-sensor) which might be a fixed part of the nacelle measuring accelerations in the back-forth and side-side direction of the nacelle.

The resulting velocity information of the nacelle-based approach comprises "lower" speed values than the rotor-based approach. As a negative consequence, the accuracy of the nacelle-based approach is worse but, as an advantage, no additional sensors at the blades or spinner are necessary to implement the suggested solution. As a further advantage, the proposed solution may be easily implemented in existing wind turbine installations. Thus, when the nacelle-based approach reaches the desired precision in the near future it may be the preferred approach.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method comprising:
   determining a direction information of a moving part of a wind turbine on a basis of at least one signal of a positioning system received at the moving part; and
   determining a speed information of the moving part of the wind turbine on a basis of the at least one signal of the positioning system, wherein the speed information corresponds to the respective direction information;
   wherein an orientation of the rotor plane is determined on the basis of the determined direction information and the corresponding speed information; and
   calibrating a yaw system of the wind turbine based on the determining the direction information, the determining the speed information, and the determining the orientation; and
   operating the yaw system based on the calibrating of the yaw system.

2. The method according to claim 1, wherein the orientation of the rotor plane being determined on the basis of the determined direction information and the corresponding speed information includes: determining a speed information in relation to a north-south direction and a speed information in relation to an east-west direction on the basis of the determined direction information and the corresponding speed information.

3. The method according to claim 1, wherein a yaw direction of the wind turbine is provided, and wherein the orientation of the rotor plane being determined on the basis of the determined direction information and the corresponding speed information includes: determining a speed information in relation to a side-side orientation of the wind turbine and a speed information in relation to a fore-after orientation of the wind turbine on the basis of the determined direction information, the corresponding speed information, and the provided yaw direction.

4. The method according to claim 1, wherein the moving part of the wind turbine is a rotating part of a rotor of the wind turbine, or is a nacelle and/or a tower.

5. The method according to claim 1, wherein the at least one signal is a satellite signal of a satellite-based Global Positioning System.

6. The method according to claim 5, wherein the direction information is determined on a basis of an analysis of Doppler Shifts of the at least one signal received at the moving part.

7. The method according to claim 1, wherein the corresponding speed information is above a defined threshold.

8. The method according to claim 1, wherein movement information of a tower and/or a nacelle is determined on basis of at least one signal provided by at least one accelerator sensor being fixed to the tower and/or the nacelle, wherein the orientation of the rotor plane being determined on the basis of the determined direction information and the corresponding speed information includes the determined movement information.

9. At least one device comprising at least one processor and/or hard-wired circuit and/or a logic device executes the method according to claim 1.

10. At least one computer program product, comprising at least one computer readable hardware storage device having at least one computer readable program code stored therein, said at least one computer readable program code executed by at least one processor of a computer system that implements the method according to claim 1.

11. At least one computer readable medium, having computer-executable instructions that causes at least one computer system to perform the method according to claim 1.

12. A wind turbine, comprising:
at least one moving part; and
one or more processors that are arranged for:
   determining direction information of the moving part on a basis of at least one received signal of a positioning system, and
   determining a speed information of the moving part of the wind turbine on a basis of the at least one signal of the positioning system, wherein the speed information corresponds to the respective direction information;
   wherein an orientation of the rotor plane is determined on the basis of the determined direction information and the corresponding speed information; and
   calibrating a yaw system of the wind turbine based on the determining the direction information, the determining the speed information, and the determining the orientation; and
   operating the yaw system based on the calibrating of the yaw system.

* * * * *